Aug. 10, 1965  S. P. CHIARENZA  3,199,916
CAR UPHOLSTERY COVER
Filed May 11, 1964

INVENTOR.
Sebastian P. Chiarenza
BY
Irving Seidman
ATTORNEY

United States Patent Office 3,199,916
Patented Aug. 10, 1965

3,199,916
CAR UPHOLSTERY COVER
Sebastian P. Chiarenza, 10 Wayside Court, Passaic, N.J.
Filed May 11, 1964, Ser. No. 366,478
1 Claim. (Cl. 297—223)

The present invention relates to a cover for car upholstery and more particularly to a cover which is adapted for selective use on the backrest or the seat portion of a car seat.

In order to protect car upholstery a great variety of seat covers have been put on the market. For the most part these seat covers fit over the entire car seat and entail considerable effort to ensure their proper installation. In the majority of cases the installation of the usual seat covers requires the employment of trained personnel. Furthermore, the fact that these seat covers are complicated in construction and require skilled installation means that their cost is high. In addition, once they are installed it requires too great an effort to remove them periodically for cleaning or to display the car's original upholstery.

It is, therefore, an object of the present invention to provide an upholstery cover which will overcome the foregoing drawbacks.

It is another object of the present invention to provide an upholstery cover which is of simple construction to permit easy installation and removal.

It is a further object of the present invention to provide an upholstery cover which may be used either to cover the seat portion or the backrest of the car seat as desired.

Additional features and advantages of the present invention will be apparent from the following description and drawing, in which.

Figure 1:
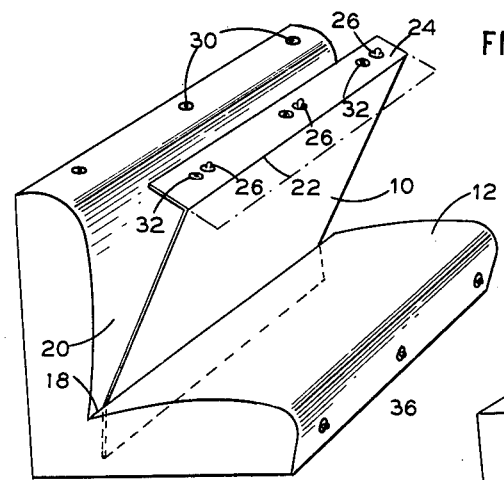
FIG. 1 is a front perspective view of the upholstery cover of the present invention when partially installed and showing its alternative uses.
Figure 2:
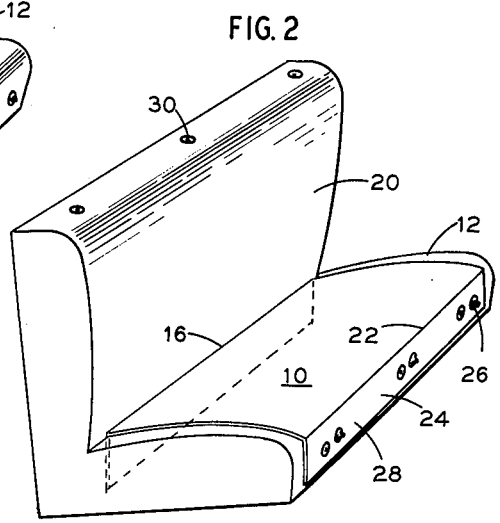
FIG. 2 is a front perspective view of the upholstery cover when installed and fastened to cover the seat portion of a car seat.
Figure 3:
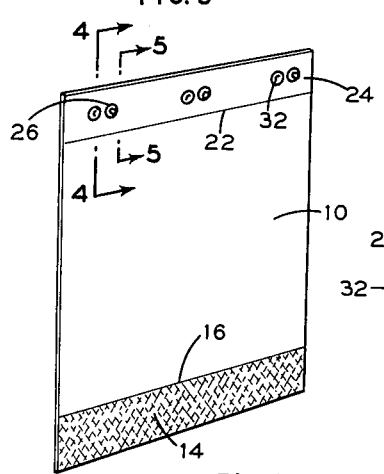
FIG. 3 is a front perspective view of the upholstery cover.
Figures 4, 5:
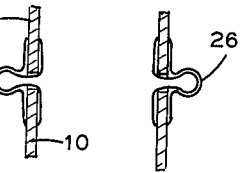
FIG. 4 is a cross-sectional view taken along the line 4—4 in FIG. 3.
FIG. 5 is a cross-sectional view taken along the line 5—5 in FIG. 3.

Referring now to the drawing, the upholstery cover is of generally rectangular shape the central and largest section of which is a body portion 10. The body portion is of a size and shape to cover an individual seat portion 12 of a car seat. An insert panel 14 is attached along a folding line 16 at one edge of the body portion 10. The insert panel 14 is a relatively narrow rectangular strip which is adaped to be inserted in the space 18 between the seat portion 12 and backrest 20 of a car seat. Preferably, the insert panel 14 is made of a resilient material so that the cover will have a measure of freedom to "give" with the movements of the user. The resiliency of the insert panel 14 also ensures a stretch fit for the panel when used as a seat or a backrest.

Along a second folding line 22 which is opposite to that with the insert panel 14, there extends an attachment panel 24. The attachment panel 24 is a narrow rectangular strip which may be bent alternatively to either side relative to the body portion 10. On the attachment panel 24 there are fastening means, such as a set of snaps 26 on the back face 28 of the cover and which are positioned to be secured to mating snaps 30 located on the top of the backrest 20. A second set of snaps 32 are on the front face 34 of the cover and are positioned to be secured to mating snaps 36 on the front edge of the seat portion 12. If the car is not provided with mating snaps, strips of loop and hook fastening materials, such as "Velcro" may be substituted.

To use the upholstery cover, the insert panel 14 is wedged into the space 18 between the seat portion 12 and the backrest 20 of the car seat. If it is desired to cover the seat portion 12, the body portion 10 is placed over it and the snaps 32 are fastened to the mating snaps 36. If, however, it is desired to cover the backrest 20, the body portion 10 is placed over that area while the attachment panel 24 is bent toward the back face 28 of the cover and the snap 26 are fastened to the mating snaps 30. Accordingly, the upholstery cover is adapted for alternative use as desired.

The body portion 10 and the attachment panel 24 may be made of any of the usual materials. If a designed fabric is selected, the design should be equally pleasing on both faces of the cover to permit its dual employment. It would be particularly useful, if the material chosen is one which is readily cleanable because it is such a simple matter to remove and reinstall this upholstery cover. A clear plastic material might be selected if the original upholstery is desired to be seen. Another possibility is the use of a cushioning material to improve the comfort of the seat or the backrest.

Figure 7:
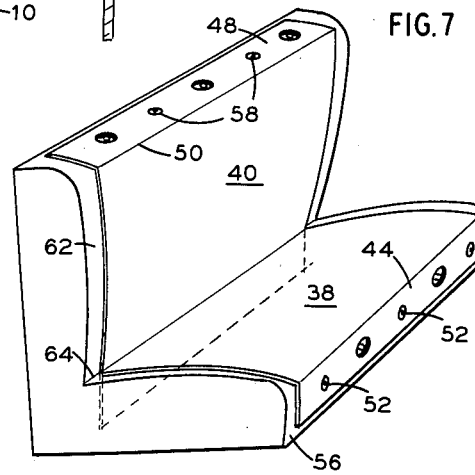
FIG. 7 is a front perspective view of the upholstery cover of FIG. 6 when installed on a car seat.
Figure 6:
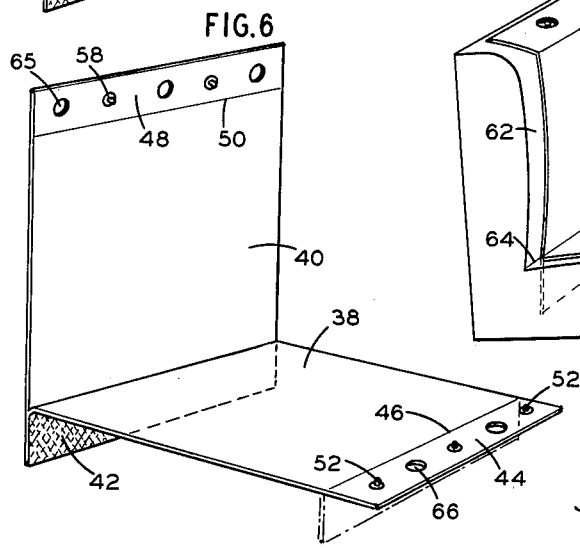
FIG. 6 is a front perspective view of another embodiment of the present invention.

Another embodiment of the present invention is shown in FIGS. 6 and 7 in which the body portion has two sections, a seat-covering section 38 and a backrest-covering section 40. These two sections are each connected along a folding line to an insert panel 42 which is adapted for insertion in the same manner as that of the previously described embodiment. At the edge opposite to that with the insert panel 42, the seat-covering section 38 has an attachment panel 44 extending along a folding line 46. Similarly, the backrest-covering section 40 has an attachment panel 48 extending along a folding line 50. On the attachment panel 44 there is a set of fastening means, such as snaps 52 which are positioned to be secured to mating snaps on the front edge of the seat portion 56 of a car seat. On the other attachment panel 48 there is a second set of snaps 58 which are positioned to be secured to mating snaps on the top of the backrest 62. In normal use, the insert panel 42 is placed in the space 64 between the backrest 62 and the seat portion 56 and one section 40 is secured to the backrest 62 and the other section 38 is secured over the seat portion 56.

It is possible to provide means by which both sections may be put down to cover the seat portion 56 or put up to cover the backrest 62. In order to do this each attachment panel should be bendable to either side relative to the body portion. Also, the snaps should be double-headed for possible attachment to mating snaps on either the backrest or the seat portion. To permit the snaps of the seat-covering section 38 to be fastened to the backrest 62, apertures 65 are positioned in the attachment panel 48 which are in register with the said snaps. In like manner, apertures 66 are positioned in the attachment panel 44 to permit the fastening of the snaps of the backrest-covering section to the mating snaps of the seat portion 56.

It may be seen, then, that the present invention provides an upholstery cover for a car which has a dual use of selective covering of either the backrest or the seat portion of a car seat. The cover is so readily installed and removed that it is feasible to use it whenever the occasion warrants it; for example, when wearing dirty work clothes, or when transporting soiled objects. The upholstery cover is inexpensive to produce and inexpensive to stock since a single size would be used for all cars.

While specific embodiments of the invention have been shown and described in detail to illustrate the application of the invention, it will be understood that the invention may be embodied otherwise without departing from such principles.

What is claimed is:

A car upholstery cover for a car seat having mating snaps on its backrest and its seat portion, said cover comprising a body portion having a seat-covering section and a backrest-covering section, a resilient insert panel attached along a folding line to one edge of each of said sections and adapted to be inserted in the space between the seat portion and backrest of a car seat, a first attachment panel connected along a second folding line to the edge of the seat-covering section opposite to that with the insert panel, and a second attachment panel connected along a third folding line to the edge of the backrest-covering section opposite to the with the insert panel, each attachment panel having a set of snaps for selective attachment to the mating snaps on the backrest and seat portion of the car seat as desired for alternative use, each attachment panel having apertures in register with the snaps of the other attachment panel to permit the fastening of both attachment panels to the backrest and the seat portion of the car seat.

References Cited by the Examiner

UNITED STATES PATENTS

| | | | |
|---|---|---|---|
| 1,295,662 | 2/19 | Witham | 297—226 |
| 1,853,579 | 4/32 | Sallop | 297—223 |
| 1,917,904 | 7/33 | Sallop | 297—223 |
| 2,109,652 | 3/38 | Sallop et al. | 297—253 |
| 2,172,890 | 9/39 | Phillips | 297—226 |
| 2,546,109 | 3/51 | Puchalsky | 297—219 |
| 3,113,803 | 12/63 | Struble | 297—220 |

FOREIGN PATENTS

| | | |
|---|---|---|
| 681,020 | 1/30 | France. |
| 1,208,146 | 9/59 | France. |
| 1,043,842 | 6/53 | France. |

FRANK B. SHERRY, *Primary Examiner.*